US006292936B1

(12) United States Patent
Wang

(10) Patent No.: US 6,292,936 B1
(45) Date of Patent: Sep. 18, 2001

(54) ENABLING MULTIPLE RUNTIME PROCESSORS IN AN INTERPRETER-BASED EMBEDDED SCRIPTING SYSTEM

(75) Inventor: Andy I-Shin Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/191,725

(22) Filed: Nov. 12, 1998

(51) Int. Cl.[7] .................................................... G06F 9/45
(52) U.S. Cl. .................... 717/5; 717/7; 707/513; 709/248; 709/311
(58) Field of Search .......................... 717/5, 7; 707/513, 707/517, 523; 709/311, 320, 201, 217, 248, 400, 204

(56) References Cited

U.S. PATENT DOCUMENTS

| 5,159,687 | 10/1992 | Richburg . |
| 5,390,314 | 2/1995 | Swanson . |
| 5,586,330 | 12/1996 | Knudsen et al. . |
| 5,623,656 | 4/1997 | Lyons . |
| 5,699,310 | 12/1997 | Garloff et al. . |
| 5,721,912 | 2/1998 | Stepczyk et al. . |
| 5,835,914 | * 11/1998 | Brim ..................................... 707/206 |
| 5,946,697 | * 8/1999 | Shen .................................... 707/104 |
| 6,061,699 | * 5/2000 | DiCecco et al. ..................... 707/513 |
| 6,065,024 | * 5/2000 | Renshaw ............................. 707/513 |
| 6,112,240 | * 8/2000 | Pogue et al. ......................... 709/224 |
| 6,112,242 | * 8/2000 | Jois et al. ............................. 709/225 |

FOREIGN PATENT DOCUMENTS

| 196 25 834 A1 | 1/1998 | (DE) . |
| 0 703 532 A2 | 3/1996 | (EP) . |
| 0 784 257 A1 | 7/1997 | (EP) . |
| 9-330212 | 12/1997 | (JP) . |

OTHER PUBLICATIONS

IBM Technical Disclosure Bulletin, "Generating Multi–Platform Build Logic from Common Source Code," vol. 40, No. 09, Sep. 1997, pp. 97–100.
IBM Technical Disclosure Bulletin, "Generating Event Adapters to Facilitate Connections Between Java Beans," vol. 41, No. 01, Jan. 1998, pp. 125–128.
IBM Technical Disclosure Bulletin, "Separating Strings from Standard Graphical User Interface Resources for Translation and Builds," vol. 39, No. 03, Mar. 1996, pp. 217–228.
Hammer, J. et al., "Template–Based Wrappers in the TSIMMIS System," ACM SIGMOD International Conference on Management of Data, Tuczon, Arizona, May 13–15, 1997, SIGMOD 1997, vol. 26, No. 2, Jun. 1997, pp. 532–535 (abstract—1 page).
Kolan, G., "Decompile Once, Run Anywhere—Protecting Your Java Source," WEB Techniques, vol. 2, No. 9, pp. 40–42, 44–46, Sep. 1997 (abstract—1p age).
Stevens, A., "Kicking and Scripting: JavaScript and CGI," Dr. Dobb's Journal, vol. 22, No. 4, pp. 92–95, 97, 114, Apr. 1997 (abstract—1 page).

* cited by examiner

Primary Examiner—Tuan Q. Dam
(74) Attorney, Agent, or Firm—Gates & Cooper LLP

(57) ABSTRACT

An interpreter-based embedded scripting environment includes multiple runtime processors executed by the computer. Each of the runtime processors processes their respective corresponding intermediate sources derived from an original input source in a synchronous manner. One or more of the respective corresponding intermediate sources includes a synchronizer token that provides synchronization among the runtime processors. Using the synchronizer token, an execution sequence of the original input source is maintained.

51 Claims, 5 Drawing Sheets

ENABLING MULTIPLE RUNTIME PROCESSORS IN AN INTERPRETER-BASED EMBEDDED SCRIPTING SYSTEM

BACKGROUND OF THE INVENTION

1. Field of the Invention

This invention relates in general to generating Web content, and in particular, to a method for enabling multiple code generators in a translator-based embedded scripting system.

2. Description of Related Art

With the fast growing popularity of the Internet and the World Wide Web (also known as "WWW" or the "Web"), there is also a fast growing demand for Web development tools. A number of different tools are available, including HTML translators, Java interpreters, JavaScript translators, etc.

A interpreter-based embedded scripting environment usually converts the original input source containing embedded script into an equivalent script format first, such that a script engine only has to deal with a final source file. For example, when the original input source is HTML text that includes embedded VisualBasic Script (VBS), a Microsoft™ Active Server Page usually converts the original input source into an equivalent VisualBasic Script, so that a VisualBasic Script interpreter only has to interpret the VisualBasic Script and not the HTML text. However, this approach fails when the container context requires a different run-time processor than the script engine.

The present invention solves this problem by introducing a technique to allow multiple runtime processors to process their corresponding portion of the original input source in a synchronized manner.

SUMMARY OF THE INVENTION

To overcome the limitations in the prior art described above, and to overcome other limitations that will become apparent upon reading and understanding the present specification, the present invention discloses a method, apparatus, and article of manufacture for providing an interpreter-based embedded scripting environment that includes multiple runtime processors executed by the computer. Each of the runtime processors processes their respective corresponding intermediate sources derived from an original input source in a synchronous manner. One or more of the respective corresponding intermediate sources includes a synchronizer token that provides synchronization among the runtime processors. Using the synchronizer token, an execution sequence of the original input source is maintained.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention discloses an interpreter-based embedded scripting environment that allows multiple runtime processors to process their corresponding portions in an original input source in a synchronous manner. The enabling infrastructure comprises a special script token, called a synchronizer token, that allows the synchronization among the runtime processors, such that the execution order or sequence of the original input source can be maintained. Generally, every runtime processor will support the script synchronizer token.

In a preferred embodiment, the original input source comprises HTML text with embedded VisualBasic Script statements. Portions of the original input source are immediately translated into Java and other portions are translated into VisualBasic Script. The portions translated into Java are interpreted by a Java Virtual Machine, while the portions translated into VisualBasic Script are interpreted by a VisualBasic Script interpreter.

Hardware Environment

Figure 1:
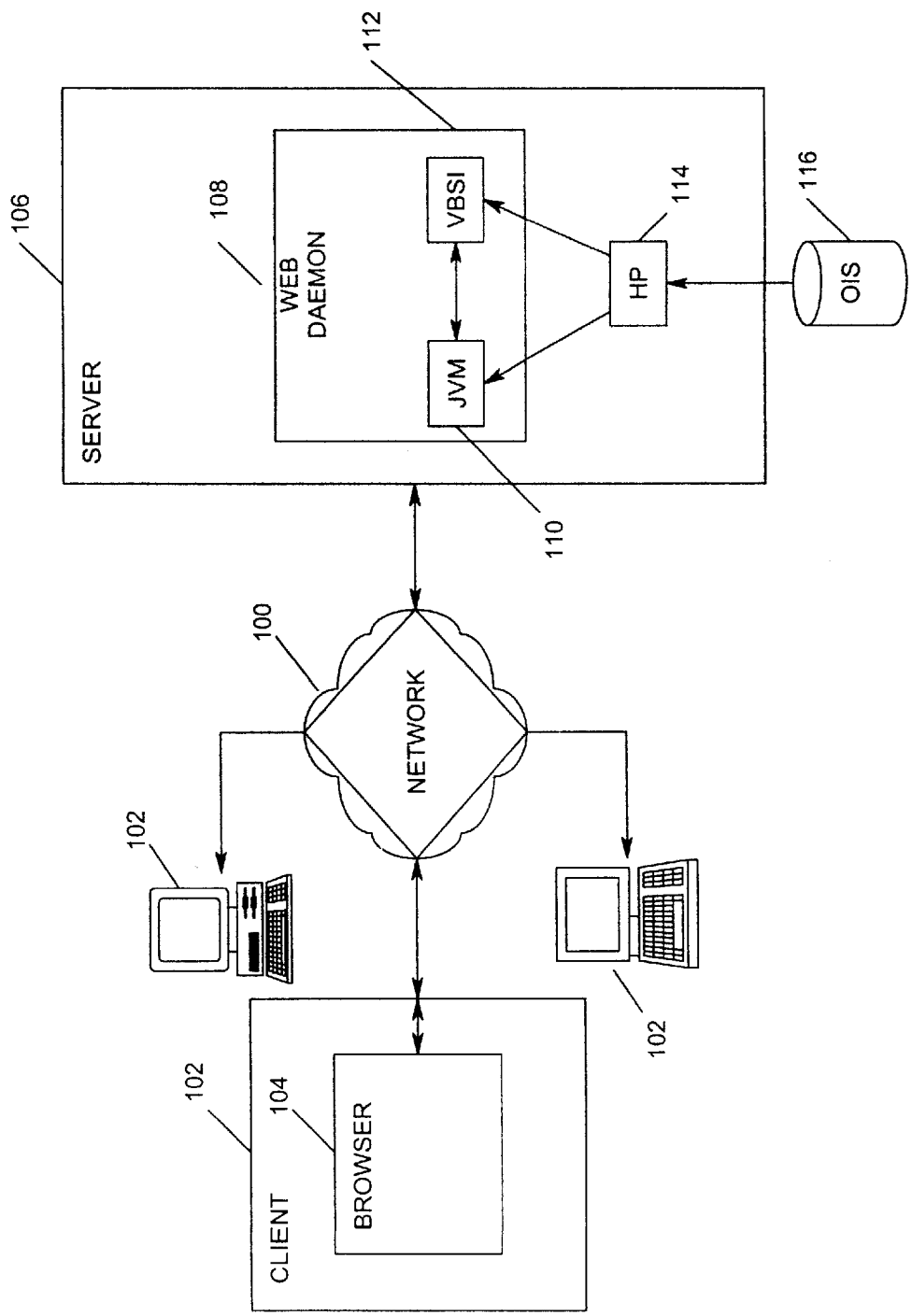
FIG. 1 is a block diagram that illustrates an exemplary client-server hardware environment of the preferred embodiment of the present invention.

FIG. 1 schematically illustrates the hardware environment of the preferred embodiment of the present invention, and more particularly, illustrates a typical distributed computer system using the Internet 100 to connect client systems 102 executing Web browsers 104 to server systems 106 executing Web daemons 108. A typical combination of resources may include clients 102 that are personal computers or workstations, and servers 106 that are personal computers, workstations, minicomputers, or mainframes. These systems are coupled to one another over a network 100, which may include other networks such as LANs, WANs, SNA networks, as well as the Internet.

The Web daemon 108 may include one or more runtime processors 110 and 112 that are executed to create the Web content. In the preferred embodiment, the runtime processors comprise a Java Virtual Machine (JVM) 110 that executes Java programming statements and a VisualBasic Script interpreter (VBSI) 112 that executes VisualBasic Script programming statements.

The server system 106 may further include one or more translators 114 that are executed to translate the original input source for the runtime processors 110 and 112. In the preferred embodiment, the translator comprises an HTML Parser (HP) 114, although those skilled in the art will recognize that other translators, interpreters, or code generators could be used as well without departing from the scope of the present invention. The translator 114 interprets the original input source (OIS) 116 comprising scripts, programming instructions, etc., and translates the OIS 116 into intermediate sources for use by the runtime processors 110 and 112.

In general, the runtime processors and translators 110, 112, and 114 comprise data and/or instructions which, when read and executed by the server computer 106, cause the computer 106 to perform the steps for performing and/or using the present invention. Generally, the data and/or instructions are embodied in and/or readable from a device, carrier or media, such as memory, data storage devices, and/or remote devices coupled to the computer 106 via a data communications device.

However, those skilled in the art will recognize that the exemplary environment illustrated in FIG. 1 is not intended to limit the present invention. Indeed, those skilled in the art will recognize that other alternative hardware environments may be used without departing from the scope of the present invention.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic and/o data embodied in or accessible from any device, carrier, or media.

Operation of the Invention

Figure 2:
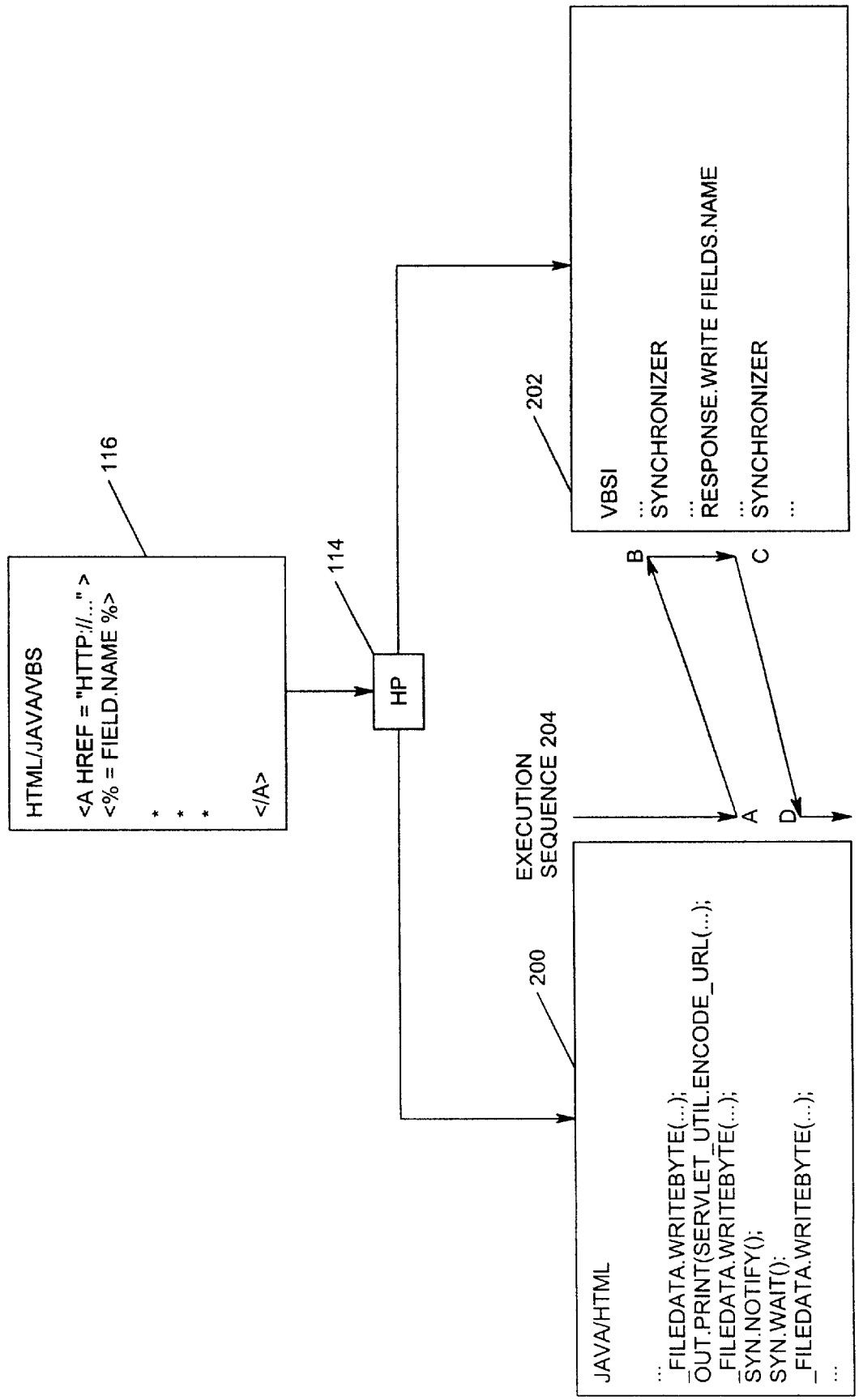
FIG. 2 is a block diagram that illustrates the operation of the preferred embodiment of the present invention.

FIG. 2 is a block diagram that illustrates one example of the operation of the present invention. In this example, the HTML Parser 114 translates the original input source 116 and generates two intermediate sources, e.g., one 200 for the Java Virtual Machine 110 and one 202 for the VisualBasic Script interpreter 112.

To create the intermediate source 200, the HTML Parser 114 translates the first VisualBasic Script block in the original input source 116 into a thread object run method in vocation, a notify method in vocation, and an immediate wait method invocation, wherein the thread object run method initiates execution of the VisualBasic Script interpreter 112, the notify method sends a notification to the VisualBasic Script interpreter 112, and the immediate wait method waits for a notification to be received from the executing VisualBasic Script interpreter 112. The remaining VisualBasic Script blocks in the original input source 116 are translated into notify method and wait method invocations.

To create the intermediate source 202, the HTML Parser 114 translates every HTML block after the first VisualBasic Script block into a synchronizer token. This is done because any HTML block before the first VisualBasic Script block does not need to be processed by the VisualBasic Script interpreter 112.

During runtime, the Java Virtual Machine 110 and the VisualBasic Script interpreter 112 execute their respective corresponding intermediate sources 200 and 202. Note specifically the execution sequence 204, wherein the flow of execution with regard to both intermediate sources 200 and 202 is indicated in the direction of the arrows and the letters A, B, C, and D associated therewith.

The Java Virtual Machine 110 performs its normal processing of the intermediate source 200 until it invokes a thread object run method to initiate execution of the VisualBasic Script interpreter 112 (indicated by the instruction SYN.NOTIFY and the letter A on the execution sequence 204), sends a notification to the VisualBasic Script interpreter 112 (also indicated by the instruction SYN.NOTIFY and the letter A on the execution sequence 204), and then waits for a notification to be received from the VisualBasic Script interpreter 112 (indicated by the instruction SYN-.WAIT and the letter D on the execution sequence 204).

Once invoked, the VisualBasic Script interpreter 112 performs its normal processing of the intermediate source 202 until it encounters a synchronizer token (indicated by the instruction SYNCHRONIZER and the letter B on the execution sequence 204). At that point, the VisualBasic Script interpreter 112 sends a notification to the Java Virtual Machine 110 and then waits to receive a notification from the Java Virtual Machine 110.

Once the notification is received from the Java Virtual Machine 110, the VisualBasic Script interpreter 112 continues its processing of the intermediate source 202 until it encounters another synchronizer token (indicated by the instruction SYNCHRONIZER and the letter C on the execution sequence 204). At that point, the VisualBasic Script interpreter 112 send a notification to the Java Virtual Machine 110 and then waits for a notification to be received from the Java Virtual Machine 110.

Once the Java Virtual Machine 110 receives the notification from the VisualBasic Script interpreter 112 (indicated by the instruction SYN.WAIT and the letter D on the execution sequence 204), it continues its normal processing of the intermediate source 200.

Note that this sequence of interaction between the Java Virtual Machine 110 and the VisualBasic Script interpreter 112 could be repeated indefinitely. Moreover, the present invention can easily be extended to any number of runtime processors. The key is to use the synchronization tokens among the runtime processors to ensure the correct sequence of execution in the intermediate source.

Logic of the HTML Parser

Figure 3:
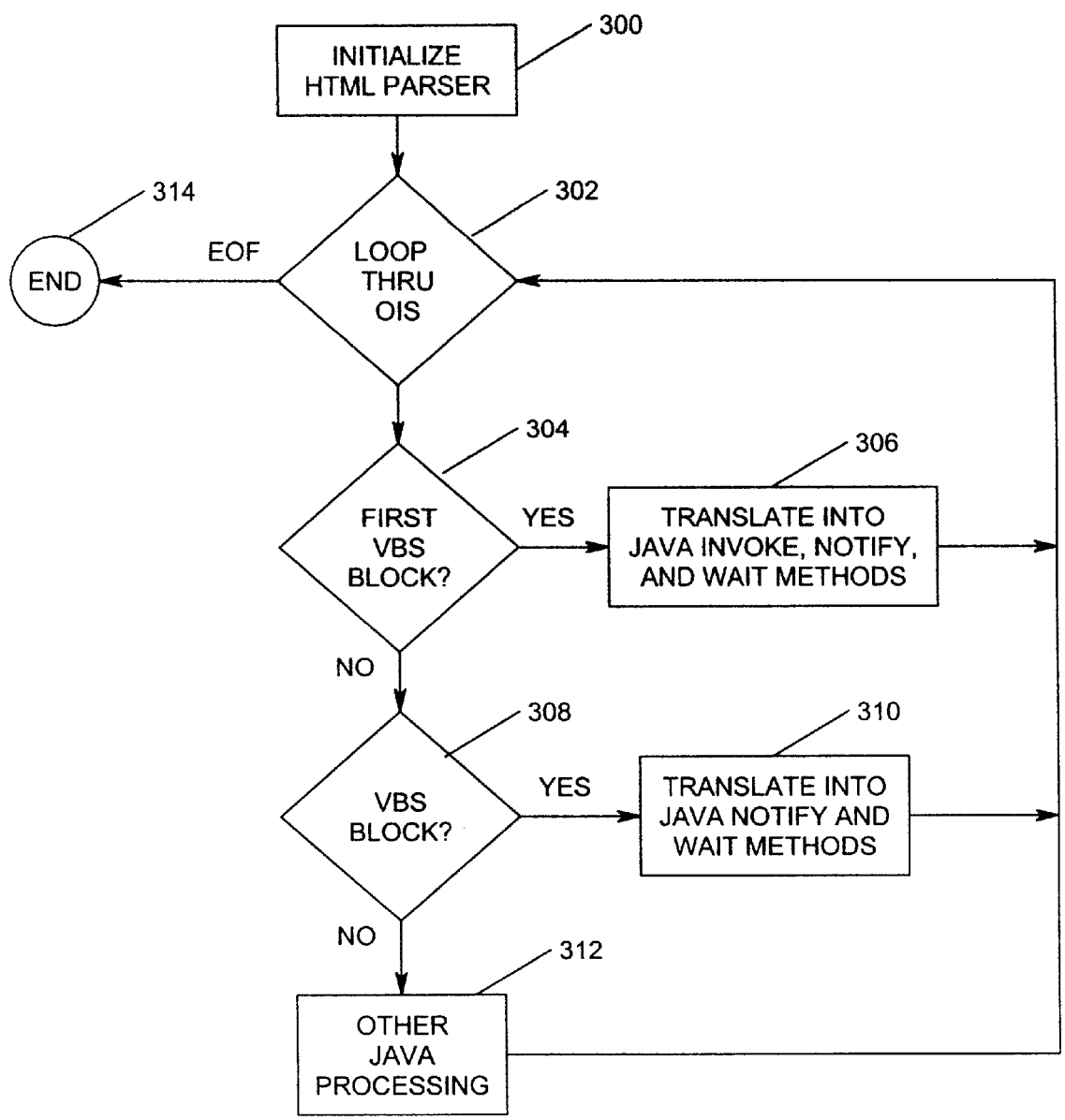
FIG. 3 is a flowchart illustrating the general logic performed by an HTML Parser according to the present invention.

FIG. 3 is a flowchart illustrating the general logic performed by the HTML Parser 114 according to the present invention.

Block 300 represents the HTML Parser 114 initializing upon invocation.

Blocks 302–312 represent the HTML Parser 114 looping to process all the statements in the original input source (OIS) 116. Thereafter, upon end-of-file (EOF), the logic ends at Block 314.

Block 304 is a decision block that represents the HTML Parser 114 determining whether the statements retrieved from OIS 116 comprise the first VisualBasic Script block. If so, control transfers to Block 306; otherwise, control transfers to Block 308.

Block 306 represents the HTML Parser 114 creating the intermediate source 200, wherein the HTML Parser 114 translates the first VisualBasic Script block into a thread object run method invocation, a notify method invocation, and an immediate wait method invocation, wherein the thread object run method initiates execution of the VisualBasic Script interpreter 112, the notify method sends a notification to the VisualBasic Script interpreter 112, and the immediate wait method waits for a notification to be received from the executing VisualBasic Script interpreter 112. Thereafter, control returns to Block 302.

Block 308 is a decision block that represents the HTML Parser 114 determining whether the statements retrieved from OIS 116 comprise the second or later VisualBasic Script blocks. If so, control transfers to Block 310; otherwise, control transfers to Block 312.

Block 310 represents the HTML Parser 114 further adding to the intermediate source 200, wherein the HTML Parser 114 translates the remaining (i.e., second or later) VisualBasic Script blocks in the original input source 116 into notify method and wait method invocations. Thereafter, control returns to Block 302.

Block 312 represents the HTML Parser 114 creating the intermediate source 202, wherein the HTML Parser 114 translates every HTML block after the first VisualBasic Script block into a synchronizer token. Thereafter, control returns to Block 302.

Logic of the Java Virtual Machine

Figure 4:
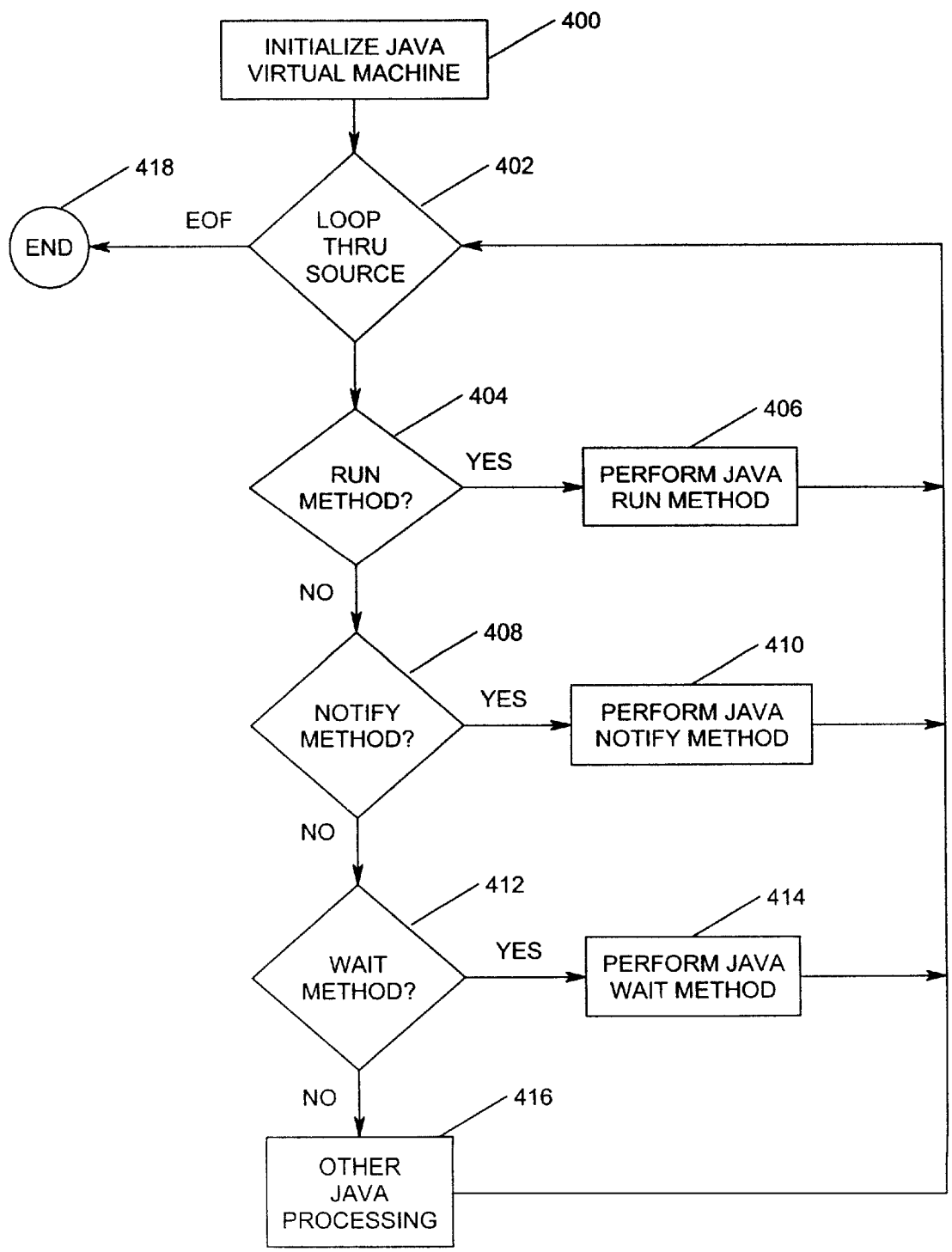
FIG. 4 is a flowchart illustrating the general logic performed by a Java Virtual Machine according to the present invention.

FIG. 4 is a flowchart illustrating the general logic performed by the Java Virtual Machine 110 according to the present invention.

Block 400 represents the Java Virtual Machine 110 initializing upon invocation.

Blocks 402–416 represent the Java Virtual Machine 110 looping to process all the statements in the intermediate source 200. Thereafter, upon end-of-file (EOF), the logic ends at Block 418.

Block 404 is a decision block that represents the Java Virtual Machine 110 determining whether the statements retrieved from intermediate source 200 comprise the thread object run method. If so, control transfers to Block 406; otherwise, control transfers to Block 408.

Block 406 represents the Java Virtual Machine 110 performing the thread object run method to invoke the VisualBasic Script interpreter 112. Thereafter, control returns to Block 402.

Block 408 is a decision block that represents the Java Virtual Machine 110 determining whether the statements retrieved from intermediate source 200 comprise the notify method. If so, control transfers to Block 410; otherwise, control transfers to Block 412.

Block 410 represents the Java Virtual Machine 110 performing the notify method to send a notification to the VisualBasic Script interpreter 112. Thereafter, control returns to Block 402.

Block 412 is a decision block that represents the Java Virtual Machine 110 determining whether the statements retrieved from intermediate source 200 comprise the wait method. If so, control transfers to Block 414; otherwise, control transfers to Block 416.

Block 414 represents the Java Virtual Machine 110 performing the wait method to receive a notification to the VisualBasic Script interpreter 112. Thereafter, control returns to Block 402.

Block 416 represents the Java Virtual Machine 110 further processing the intermediate source 200. At this Block, the Java Virtual Machine 110 performs Java source interpretation, translates HTML blocks, etc. Thereafter, control returns to Block 402.

Logic of the VisualBasic Script Interpreter

Figure 5:
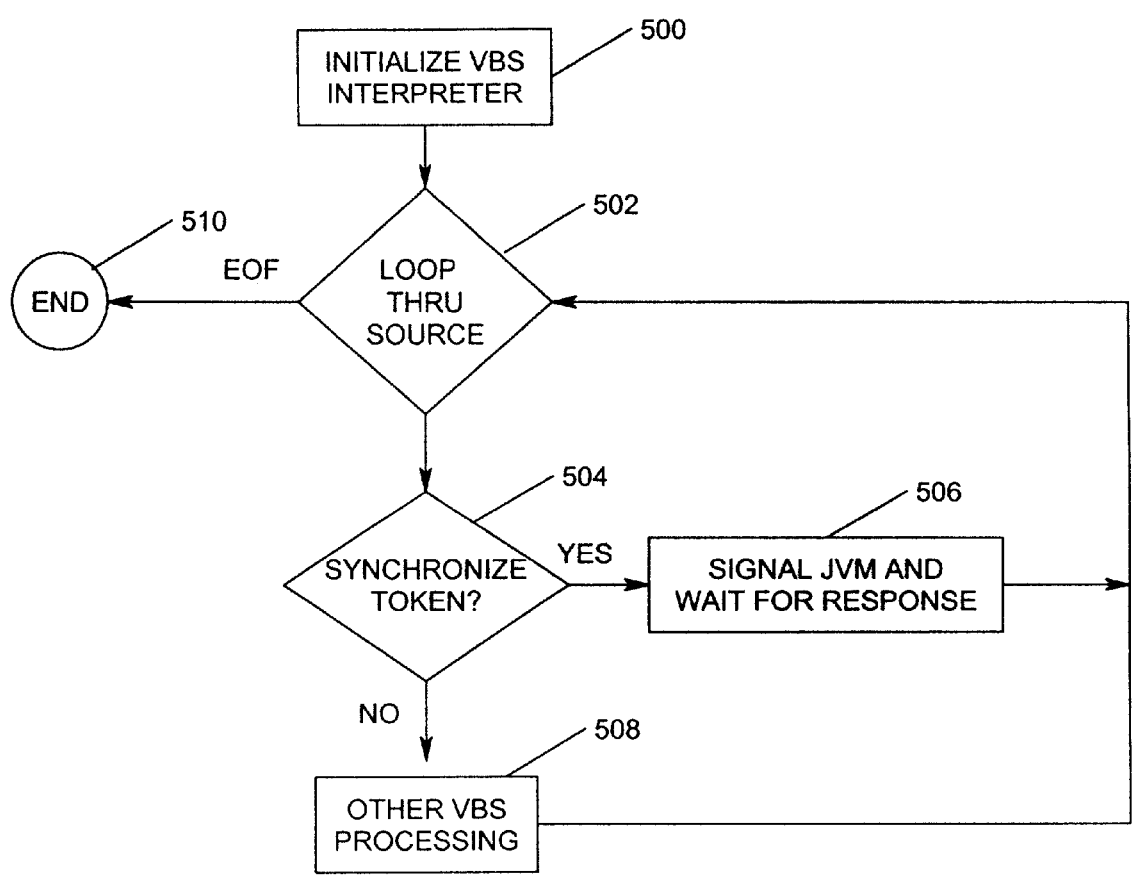
FIG. 5 is a flowchart illustrating the general logic performed by a VisualBasic Script Interpreter according to the present invention.

FIG. 5 is a flowchart illustrating the general logic performed by the VisualBasic Script interpreter 112 according to the present invention.

Block 500 represents the VisualBasic Script interpreter 112 initializing upon invocation.

Blocks 502–508 represent the VisualBasic Script interpreter 112 looping to process all the statements in the intermediate source 202. Thereafter, upon end-of-file (EOF), the logic ends at Block 510.

Block 504 is a decision block that represents the VisualBasic Script interpreter 112 determining whether the statements retrieved from intermediate source 202 comprise the synchronizer token. If so, control transfers to Block 506; otherwise, control transfers to Block 508.

Block 506 represents the VisualBasic Script interpreter 112 performing the steps associated with the synchronizer token, i.e., sending a notification to the Java Virtual Machine 110 and waiting to receive a notification from the Java Virtual Machine 110. Thereafter, control returns to Block 502.

Block 508 represents the VisualBasic Script interpreter 112 further processing the intermediate source 202. At this Block, the VisualBasic Script interpreter 112 performs standard VisualBasic Script interpretation, etc. Thereafter, control returns to Block 502.

Conclusion

This concludes the description of the preferred embodiment of the invention. The following describes some alternative embodiments for accomplishing the present invention. For example, any type of computer, such as a mainframe, minicomputer, or personal computer, could be used to implement the present invention. In addition, the present invention is not limited by specific programming languages, and could comprise languages other than HTML, Java, VisualBasic Script, for example, C, C++, Perl, Cobol, etc.

In summary, the present invention discloses a method, apparatus, and article of manufacture for providing an interpreter-based embedded scripting environment that includes multiple runtime processors executed by the computer. Each of the runtime processors processes their respective corresponding intermediate sources derived from an original input source in a synchronous manner. One or more of the respective corresponding intermediate sources includes a synchronizer token that provides synchronization among the runtime processors. Using the synchronizer token, an execution sequence of the original input source is maintained.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An interpreter-based embedded scripting environment, comprising:

(a) a computer; and (b) a plurality of runtime processors, executed by the computer, for processing their respective corresponding intermediate sources derived from an original input source in a synchronous manner, wherein one or more of the corresponding intermediate sources includes a synchronizer token that provides synchronization among the runtime processors, such that an execution sequence of the original input source is maintained.

2. The interpreter-based embedded scripting environment of claim 1, wherein every runtime processor supports the synchronizer token.

3. The interpreter-based embedded scripting environment of claim 1, wherein the synchronizer token comprises one or more script tokens.

4. The interpreter-based embedded scripting environment of claim 1, wherein the original input source comprises HTML text with embedded VisualBasic Script statements.

5. The interpreter-based embedded scripting environment of claim 1, wherein the original input source comprises Java statements with embedded VisualBasic Script statements.

6. The interpreter-based embedded scripting environment of claim 1, wherein the respective corresponding intermediate sources comprise programming statements selected from a group comprising Java, VisualBasic Script, and HTML.

7. The interpreter-based embedded scripting environment of claim 1, further comprising a translator, executed by the computer, for translating the original input source into the respective corresponding intermediate sources.

8. The interpreter-based embedded scripting environment of claim 7, wherein the translator comprises an HTML Parser.

9. The interpreter-based embedded scripting environment of claim 7, wherein the translator translates a first VisualBasic Script block into a thread object run method invocation, a notify method invocation, and an immediate wait method invocation for a Java Virtual Machine.

10. The interpreter-based embedded scripting environment of claim 9, wherein the translator translates remaining VisualBasic Script blocks in the original input source into notify method and wait method invocations for the Java Virtual Machine.

11. The interpreter-based embedded scripting environment of claim 7, wherein the translator translates every HTML block after a first VisualBasic Script block into a synchronizer token.

12. The interpreter-based embedded scripting environment of claim 7, wherein the runtime processors are selected from a group comprising a Java Virtual Machine and a VisualBasic Script interpreter.

13. The interpreter-based embedded scripting environment of claim 12, wherein the Java Virtual Machine performs its normal processing until it invokes a thread object to initiate execution of the VisualBasic Script interpreter, sends a notification to the VisualBasic Script interpreter, and then waits for a notification from the VisualBasic Script interpreter.

14. The interpreter-based embedded scripting environment of claim 13, wherein the VisualBasic Script interpreter performs its normal processing of its respective corresponding intermediate source until it encounters a synchronizer token, at which point it waits to receive a notification from the Java Virtual Machine.

15. The interpreter-based embedded scripting environment of claim 14, wherein the VisualBasic Script interpreter, once the notification is received from the Java Virtual Machine, continues processing its respective corresponding intermediate source until it encounters another synchronizer token, at which point, it send a notification to the Java Virtual Machine.

16. The interpreter-based embedded scripting environment of claim 15, wherein the Java Virtual Machine, once it receives the notification from the VisualBasic Script interpreter, performs any additional processing of its respective corresponding intermediate source.

17. The interpreter-based embedded scripting environment of claim 12, wherein a sequence of interaction between the Java Virtual Machine and the VisualBasic Script interpreter is repeated indefinitely.

18. A method of processing scripts in an interpreter-based embedded scripting environment, comprising the steps of:
(a) processing an original input source to create respective corresponding intermediate sources for a plurality of runtime processors executed by a computer, wherein one or more of the corresponding intermediate sources includes a synchronizer token; and
(b) synchronously executing the respective corresponding intermediate sources in the runtime processors, such that an execution sequence of the original input source is maintained.

19. The method of claim 18, wherein every runtime processor supports the synchronizer token.

20. The method of claim 18, wherein the synchronizer token comprises one or more script tokens.

21. The method of claim 18, wherein the original input source comprises HTML text with embedded VisualBasic Script statements.

22. The method of claim 18, wherein the original input source comprises Java statements with embedded VisualBasic Script statements.

23. The method of claim 18, wherein the respective corresponding intermediate sources comprise programming statements selected from a group comprising Java, VisualBasic Script, and HTML.

24. The method of claim 18, further comprising translating the original input source into the respective corresponding intermediate sources using a translator executed by the computer.

25. The method of claim 24, wherein the translator comprises an HTML Parser.

26. The method of claim 24, further comprising translating a first VisualBasic Script block into a thread object run method invocation, a notify method invocation, and an immediate wait method invocation for a Java Virtual Machine.

27. The method of claim 26, further comprising translating remaining VisualBasic script blocks in the original input source into notify method and wait method invocations for the Java Virtual Machine.

28. The method of claim 24, further comprising translating every HTML block after a first VisualBasic Script block into a synchronizer token.

29. The method of claim 24, wherein the runtime processors are selected from a group comprising a Java Virtual Machine and a VisualBasic Script interpreter.

30. The method of claim 29, further comprising performing normal processing in the Java Virtual Machine until it invokes a thread object to initiate execution of the VisualBasic Script interpreter, sends a notification to the VisualBasic Script interpreter, and then waits for a notification from the VisualBasic Script interpreter.

31. The method of claim 30, further comprising performing normal processing in the VisualBasic Script interpreter of its respective corresponding intermediate source until it encounters a synchronizer token, at which point it waits to receive a notification from the Java Virtual Machine.

32. The method of claim 31, further comprising continuing processing in the VisualBasic Script interpreter, once the notification is received from the Java Virtual Machine, of its respective corresponding intermediate source until it encounters another synchronizer token, at which point, it send a notification to the Java Virtual Machine.

33. The method of claim 32, further comprising performing any additional processing in the Java Virtual Machine, once it receives the notification from the VisualBasic Script interpreter, of its respective corresponding intermediate source.

34. The method of claim 29, wherein a sequence of interaction between the Java Virtual Machine and the VisualBasic Script interpreter is repeated indefinitely.

35. An article of manufacture embodying logic for performing a method of processing scripts in an interpreter-based embedded scripting environment, the method comprising the steps of:

(a) processing an original input source to create respective corresponding intermediate sources for a plurality of runtime processors executed by a computer, wherein one or more of the corresponding intermediate sources includes a synchronizer token; and (b) synchronously executing the respective corresponding intermediate sources in the runtime processors, such that an execution sequence of the original input source is maintained.

36. The method of claim 35, wherein every runtime processor supports the synchronizer token.

37. The method of claim 35, wherein the synchronizer token comprises one or more script tokens.

38. The method of claim 35, wherein the original input source comprises HTML text with embedded VisualBasic Script statements.

39. The method of claim 35, wherein the original input source comprises Java statements with embedded VisualBasic Script statements.

40. The method of claim 35, wherein the respective corresponding intermediate sources comprise programming statements selected from a group comprising Java, VisualBasic Script, and HTML.

41. The method of claim 35, further comprising translating the original input source into the respective corresponding intermediate sources using a translator executed by the computer.

42. The method of claim 41, wherein the translator comprises an HTML Parser.

43. The method of claim 41, further comprising translating a first VisualBasic Script block into a thread object run method invocation, a notify method invocation, and an immediate wait method invocation for a Java Virtual Machine.

44. The method of claim 43, further comprising translating remaining VisualBasic Script blocks in the original input source into notify method and wait method invocations for the Java Virtual Machine.

45. The method of claim 41, further comprising translating every HTML block after a first VisualBasic Script block into a synchronizer token.

46. The method of claim 41, wherein the runtime processors are selected from a group comprising a Java Virtual Machine and a VisualBasic Script interpreter.

47. The method of claim 46, further comprising performing normal processing in the Java Virtual Machine until it invokes a thread object to initiate execution of the VisualBasic Script interpreter, sends a notification to the VisualBasic Script interpreter, and then waits for a notification from the VisualBasic Script interpreter.

48. The method of claim 47, further comprising performing normal processing in the VisualBasic Script interpreter of its respective corresponding intermediate source until it encounters a synchronizer token, at which point it waits to receive a notification from the Java Virtual Machine.

49. The method of claim 48, further comprising continuing processing in the VisualBasic Script interpreter, once the notification is received from the Java Virtual Machine, of its respective corresponding intermediate source until it encounters another synchronizer token, at which point, it send a notification to the Java Virtual Machine.

50. The method of claim 49, further comprising performing any additional processing in the Java Virtual Machine, once it receives the notification from the VisualBasic Script interpreter, of its respective corresponding intermediate source.

51. The method of claim 46, wherein a sequence of interaction between the Java Virtual Machine and the VisualBasic Script interpreter is repeated indefinitely.

* * * * *